US010247358B2

(12) United States Patent
Allidieres

(10) Patent No.: US 10,247,358 B2
(45) Date of Patent: Apr. 2, 2019

(54) METHOD AND STATION FOR FILLING GAS TANKS

(71) Applicant: L'Air Liquide, Societe Anonyme pour l'Etude et l'Exploitation des Procedes Georges Claude, Paris (FR)

(72) Inventor: Laurent Allidieres, Saint Martin D'Uriage (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 139 days.

(21) Appl. No.: 14/903,001

(22) PCT Filed: May 28, 2014

(86) PCT No.: PCT/FR2014/051264
§ 371 (c)(1),
(2) Date: Jan. 5, 2016

(87) PCT Pub. No.: WO2015/001208
PCT Pub. Date: Jan. 8, 2015

(65) Prior Publication Data
US 2016/0146400 A1 May 26, 2016

(30) Foreign Application Priority Data

Jul. 5, 2013 (FR) ...................... 13 56618

(51) Int. Cl.
F17C 5/06 (2006.01)
F17C 5/00 (2006.01)
(52) U.S. Cl.
CPC .............. F17C 5/06 (2013.01); F17C 5/007 (2013.01); F17C 2221/012 (2013.01);
(Continued)

(58) Field of Classification Search
CPC ....... F17C 5/06; F17C 5/007; F17C 2221/012
(Continued)

(56) References Cited

U.S. PATENT DOCUMENTS 5,531,807 A * 7/1996 McCombs ............... A62B 7/14
55/357
7,867,300 B2 * 1/2011 Chellappa ............. B01J 19/249
423/237
(Continued)

FOREIGN PATENT DOCUMENTS

FR 2919375 A1 1/2009
FR 2928716 A1 9/2009
(Continued)

OTHER PUBLICATIONS

International Search Report and Written Opinion for PCT/FR2014/051264, dated Feb. 9, 2015.
(Continued)

Primary Examiner — Jason K Niesz
Assistant Examiner — James Hakomaki
(74) Attorney, Agent, or Firm — Christopher J. Cronin

(57) ABSTRACT

Method for filling a tank with pressurized hydrogen via a filling station comprising at least one buffer container and a fluid circuit connected to said at least one buffer container, the circuit of the filling station comprising a first end connected to at least one source of hydrogen gas, the circuit comprising a second end fitted with a transfer pipe intended to be connected removably to the tank that is to be filled, the method involving a step of cooling the hydrogen supplied to the tank by transferring negative calories between a cold source and the hydrogen, the method being characterized in that it comprises a step of purifying the hydrogen supplied by the source in a purification member before transferring it to the at least one buffer container, and in that it comprises (Continued)

a step of transferring negative calories from said cold source to the hydrogen before and/or during the purification step.

13 Claims, 1 Drawing Sheet

(52) U.S. Cl.
CPC ............ *F17C 2223/0123* (2013.01); *F17C 2223/033* (2013.01); *F17C 2225/0123* (2013.01); *F17C 2225/036* (2013.01); *F17C 2227/0157* (2013.01); *F17C 2227/0185* (2013.01); *F17C 2227/0348* (2013.01); *F17C 2227/0355* (2013.01); *F17C 2227/0365* (2013.01); *F17C 2227/0388* (2013.01); *F17C 2227/043* (2013.01); *F17C 2250/01* (2013.01); *F17C 2260/046* (2013.01); *F17C 2265/01* (2013.01); *F17C 2265/065* (2013.01); *F17C 2270/0139* (2013.01); *Y02E 60/321* (2013.01); *Y02P 90/45* (2015.11)

(58) Field of Classification Search
USPC .......................................................... 141/3, 4
See application file for complete search history.

(56) References Cited

U.S. PATENT DOCUMENTS

| | | | |
|---|---|---|---|
| 9,776,863 B2* | 10/2017 | Iaquaniello | C01B 3/505 |
| 2008/0264514 A1* | 10/2008 | Tessier | B01D 53/0438 |
| | | | 141/4 |
| 2009/0023040 A1* | 1/2009 | Paik | H01M 8/04231 |
| | | | 429/429 |
| 2009/0229701 A1* | 9/2009 | Allidieres | F17C 5/06 |
| | | | 141/2 |
| 2010/0193070 A1 | 8/2010 | Allidieres | |
| 2011/0085966 A1* | 4/2011 | Vauk | C01B 3/12 |
| | | | 423/648.1 |
| 2011/0203455 A1* | 8/2011 | Schmit | B01D 53/22 |
| | | | 95/51 |
| 2015/0368102 A1* | 12/2015 | Louis | C01B 3/50 |
| | | | 141/4 |
| 2016/0146400 A1 | 5/2016 | Allidieres | |

FOREIGN PATENT DOCUMENTS

| | | |
|---|---|---|
| FR | 2960041 A1 | 11/2011 |
| FR | 2973858 A1 | 10/2012 |
| WO | WO2012147340 A1 | 11/2012 |
| WO | WO2015001208 A2 | 1/2015 |

OTHER PUBLICATIONS

French Search Report and Written Opinion for FR1356618, dated Apr. 1, 2014.
International Search Report and Written Opinion for PCT/FR2014/051276, dated Feb. 9, 2015.
French Search Report and Written Opinion for FR 1 356 620, dated Apr. 1, 2014.

* cited by examiner

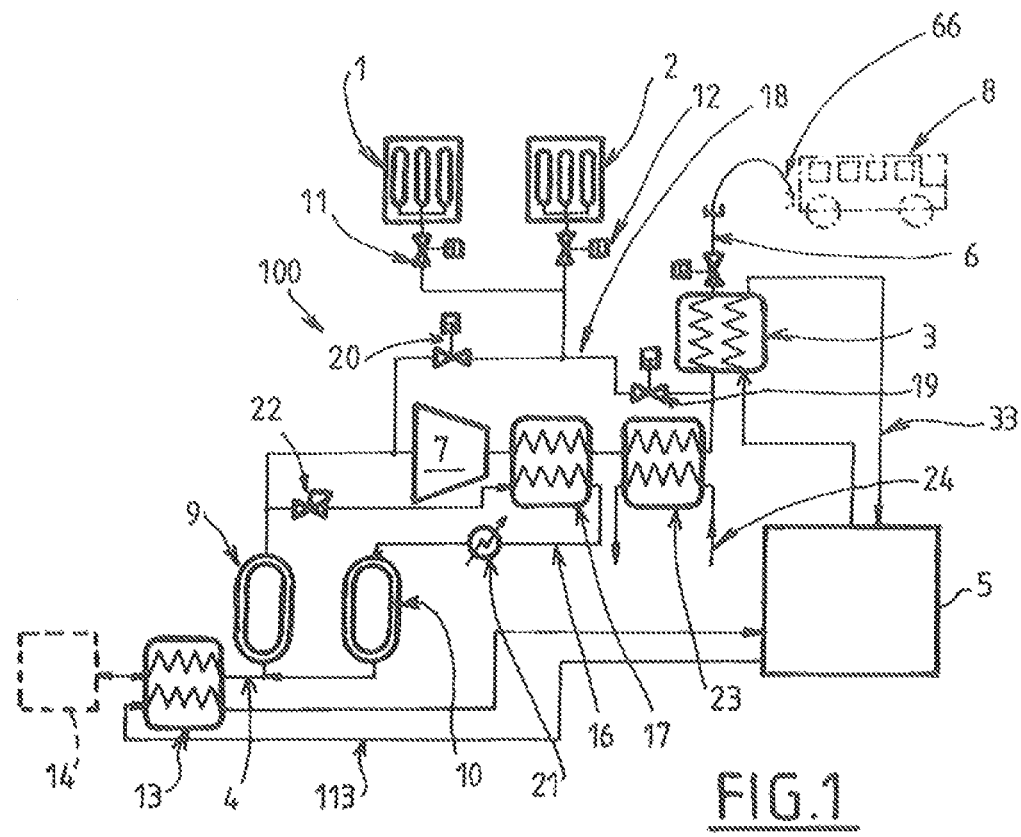
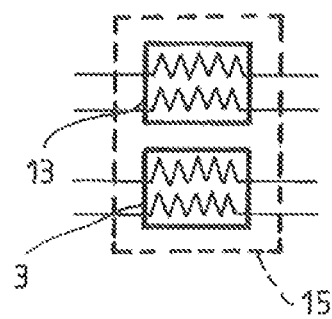

METHOD AND STATION FOR FILLING GAS TANKS

CROSS-REFERENCE TO RELATED APPLICATIONS

This application is a § 371 of International PCT Application PCT/FR2014/051264, filed May 28, 2014, which claims § 119(a) foreign priority to French patent application FR1356618, filed Jul. 5, 2013.

BACKGROUND

Field of the Invention

The present invention relates to a method and station for filling a gas tank.

The invention relates more particularly to a method of filling a tank with pressurized hydrogen via a filling station comprising at least one buffer container and a fluid circuit connected to said at least one buffer container, the circuit of the filling station comprising a first end connected to at least one source of gaseous hydrogen for carrying out the filling of the at least one buffer container with gas originating from the source, the circuit comprising a second end equipped with a transfer pipe intended to be removably connected to the tank to be filled with hydrogen originating from the at least one buffer container, the method comprising a step of cooling the hydrogen supplied to the tank by transfer of negative calories between a cold source and the hydrogen.

Related Art

The fast filling (typically in less than 15 minutes) of tanks of fuel gas (hydrogen in particular) at high pressure (300 to 800 bar for example) is generally carried out by successive equalizations between buffer containers at high pressure (for example 200, 300, 450 or 850 bar) and the tank to be filled. This filling may, where necessary, be complemented or supplemented by one or more compressors.

In order to limit the increase in temperature in the tanks due to the adiabatic nature of the compression, the fuel gas is cooled, for example to a temperature of the order of −40° C. before it enters the tank. This cooling is generally carried out via a heat exchanger supplied with a refrigerant or cryogenic fluid. These methods are described abundantly in the literature.

Reference may for example be made to documents FR 2919375 A1, FR 2973858 A1 and FR 2919375 A1 that describe filling stations to which the present invention may apply.

The fuel cells in particular of "PEMFC" type installed on board vehicles that use this hydrogen fuel must be supplied with a very pure hydrogen. A wealth of literature has described the impacts of impurities (such as water, CO, $H_2S$) in the hydrogen on the performance and service life of the fuel cells. Strict standards have thus been developed to ensure that the hydrogen delivered to the tanks does not damage the cells (cf. for example the ISO 14687-2 standard).

The known and relatively inexpensive industrial manufacturing processes do not make it possible to ensure such a degree of purity continuously.

In order to guarantee a degree of purity of the hydrogen, it may be necessary to add, upstream of the filling stations, extremely expensive purification steps, such as purifications over a bed of adsorbent operating at cryogenic temperature or palladium membranes.

Another solution consists in supplying the filling station with hydrogen that is liquid, and therefore very pure, or via electrolyzers. These solutions are however expensive.

SUMMARY OF THE INVENTION

One object of the present invention is to alleviate all or some of the abovementioned disadvantages of the prior art.

For this purpose, the method according to the invention, furthermore in accordance with the generic definition given in the preamble above, is essentially characterized in that it comprises a step of purifying the hydrogen supplied by the source in a purification component before it is transferred to the at least one buffer container, and in that it comprises a step of transferring negative calories from said cold source to the hydrogen before and/or during the purification step.

This makes it possible to use a source of hydrogen a priori incompatible with the specifications of the fuel cells in a filling station by using a purification system of standard or non-standard technology that is fully integrated into the station.

The combined use of the cold source (cold group) for the cooling of the filling gas and of the purification system allows a saving to be made and enables a particularly effective operation of the station.

Moreover, some embodiments of the invention may comprise one or more of the following features:

- the transfer of negative calories between the cold source and the hydrogen supplied to the tank is carried out via a first heat exchanger in thermal exchange with the hydrogen of the circuit and a loop for circulation of heat transfer fluid between the cold source and the first heat exchanger,
- the transfer of negative calories from said cold source to the hydrogen before and/or during the purification step is carried out via a second heat exchanger in thermal exchange and a loop for circulation of heat transfer fluid between the cold source and the second heat exchanger,
- the purification step uses at least one purification component from among: a pressure swing adsorption (PSA or TSA) separation device,
- the cold source comprises at least one from among: a reserve of liquefied gas such as nitrogen, ethylene glycol in aqueous solution at various mass concentrations, ammonia solution, propane, or any other refrigerant,
- the circuit of the filling station comprises at least one compression component for compressing pressurized gas in order to fill the at least one buffer container,
- the method comprises a step of transferring calories between, on the one hand, the compressed gas at the outlet of the compression component and, on the other hand, the purification component,
- the purification component operates according to a cycle comprising a gas purification phase and a regeneration phase, the step of transferring calories between the compressed gas at the outlet of the compression component and the purification component is carried out during the regeneration phase of the purification component,
- the circuit for selective transfer of calories from the compressed gas at the outlet of the compression component to the purification component comprises a third heat exchanger positioned at the outlet of the compression component in thermal exchange with the gas at the outlet of the compression component and a heat transfer fluid pipe selectively connecting the third heat exchanger to the purification component and/or to the second heat exchanger.

The invention also relates to a filling station for a pressurized gaseous hydrogen tank comprising at least one buffer container provided in order to contain pressurized gaseous hydrogen, a fluid circuit comprising a plurality of valves, the circuit being connected to said at least one buffer container and comprising a first end intended to be connected to at least one source of gaseous hydrogen for enabling the filling of the at least one buffer container with gas supplied by the at least one source, the circuit comprising a second end comprising a filling pipe intended to be removably connected to a tank in order to fill said tank from the at least one buffer container, the station comprising a cold source of negative calories and a circuit for selective transfer of negative calories from the cold source to the hydrogen at the second end of the circuit, the station also comprising a circuit for selective transfer of negative calories from the cold source to the hydrogen at the first end of the circuit, upstream of and/or level with the purification component.

According to other possible specific features:
the circuit for selective transfer of negative calories from the cold source to the gas at the second end of the circuit comprises a first heat exchanger in thermal exchange with the gas of the circuit and a loop for circulation of heat transfer fluid between the cold source and the first heat exchanger,
the circuit for selective transfer of negative calories from the cold source to the hydrogen at the first end of the circuit, upstream of and/or level with the purification component, comprises a second heat exchanger in thermal exchange and a loop for circulation of heat transfer fluid between the cold source and the second heat exchanger,
the first heat exchanger and the second heat exchanger are incorporated in a same housing,
the circuit of the filling station comprises at least one compression component such as a compressor for compressing hydrogen in order to fill the at least one buffer container, the purification component comprising one or more beds of adsorbent of pressure swing adsorption type operating according to a cycle comprising a gas purification phase and a regeneration phase and in that the station comprises a circuit for selective transfer of calories from compressed gas at the outlet of the compression component to the purification component,
the purification component comprises a pressure swing adsorption (PSA or TPSA) separation device comprising several beds of adsorbent of type operating cyclically and alternately, in particular a device of the type using temperature and pressure swing adsorption (TPSA).

The invention may also relate to any alternative device or method comprising any combination of the features above or below.

BRIEF DESCRIPTION OF THE FIGURES

Other specific features and advantages will become apparent from reading the following description given with reference to the figures in which:

FIG. 1 which represents a schematic and partial view illustrating the structure and the operation of a filling station according to one possible exemplary embodiment of the invention, FIG. 2 represents a schematic and partial view of a detail of the station from FIG. 1 according to another possible embodiment.

DETAILED DESCRIPTION OF THE INVENTION

The filling station 100 represented by way of nonlimiting example is a station provided in order to carry out the filling of tanks 8 of gaseous hydrogen at high pressure (for example at a pressure between 300 and 850 bar).

Conventionally, the filling station 100 comprises several buffer containers 1, 2 (two in this nonlimiting example but there may be one, three or more than three thereof).

Each buffer container 1, 2, is a tank or set of tanks provided in order to contain gaseous hydrogen pressurized to a given pressure, for example respectively 450 bar and 850 bar. The station 100 comprises a fluid circuit 11, 12, 18, 4, 6 comprising a plurality of pipes and valves. The circuit is connected to the buffer containers 1, 2. The circuit comprises a first end 4 intended to be connected to at least one source 14 of gaseous hydrogen in order to enable the filling of the buffer containers 1, 2 with gas originating from the source 14.

The source 14 of hydrogen may conventionally comprise at least one from among: a network of hydrogen gas at a pressure between 1.3 bar abs (bar absolute) and 200 bar abs and a component for producing hydrogen such as an electrolyzer, a natural gas reformer ("SMR"), a methanol cracking device, an autothermal reforming ("ATR") device, a partial oxidation ("POX") device, etc.

The circuit comprises a second end equipped with at least one filling pipe 6 intended to be removably connected (via an appropriate connector 66) to a tank 8 to be filled.

More specifically, the buffer containers 1, 2 are connected in parallel, via respective valves 11, 12, to the filling pipe 6.

Similarly, one, two or more than two gas sources 14 may be connected in parallel via respective valves to the filling pipe 6 (at the first end).

The filling pipe 6 may comprise, upstream of the connector 66, a compressor 7. Several compressors in parallel or in series may of course also be envisaged.

The compressor 7 may be equipped with an upstream valve and a downstream valve (not represented for the sake of simplification).

As represented, a bypass pipe 18 for bypassing the compressor 7 may be provided. The bypass pipe 18 may comprise two valves 20 and 19 and may be the collecting pipe that connects the buffer containers 1, 2 to the filling pipe 6.

This bypass pipe 18 also enables the filling of the buffer containers 1, 2 via the compressor 7.

The station 100 also comprises, at the first end 4, a component 9, 10 for purifying the hydrogen supplied by the source, preferably upstream of the compressor 7. The purification component preferably comprises a known temperature and pressure swing adsorption (TPSA) separation device, comprising one and preferably several beds of adsorbent (molecular sieves and/or activated carbons). For example, and as represented, the purification component 9, 10 comprises two beds of adsorbent (zeolites or others) positioned in parallel in the circuit. The gas supplied by the source 14 is admitted alternately into one then the other of the adsorbents 9, 10 by a system of valves, the adsorbents 9, 10 operating alternately (regeneration of one under relative conditions of high temperature and of low pressure during the adsorption under relative conditions of low temperature and high pressure of the other). For example, it may be a TSA of the type having a coaxial bed. For the sake of simplification, FIG. 1 does not represent all the pipes and valves necessary (known moreover) for ensuring the decrease in pressure or the increase in temperature of the tanks 9 and 10 and also the transition into production mode from one adsorber 9, 10 to the other.

The station 100 additionally comprises, at the transfer pipe 6, a system of selective cooling (i.e. a controlled cooling) of the gas supplied to the tank 8 (for example the hydrogen is cooled to a low temperature of between −196° C. and −40° C.). As represented in FIG. 1, this cooling may be carried out conventionally via a first heat exchanger 3 in thermal exchange with the gas of the circuit and a loop 33 for circulation of heat transfer fluid between a cold source 5 and the first heat exchanger 3. Conventionally, this circulation loop 33 may comprise valves and/or pumps which are not represented for the sake of simplification.

The cold source 5 may comprise at least one from among: a reserve of liquefied gas such as nitrogen, ethylene glycol in aqueous solution at various mass concentrations, ammonia solution, propane, or any other suitable refrigerant.

The station 100 additionally comprises a selective transfer of negative calories (selective is to say which preferably can be controlled in intensity according to the refrigeration requirements) between the cold source 5 and gas before or during the purification step. For this purpose, the station 100 may comprise a second heat exchanger 13 in thermal exchange with the gas at the inlet of the purification component 9, 10 and a loop 113 for circulation of heat transfer fluid between the cold source 5 and the second heat exchanger 13. Of course, any other system for cooling the gas entering the purification component 9, 10 and/or for cooling the purification component 9, 10 itself may be provided.

This cooling of the gas and/or of the purification component 9, 10 may be particularly advantageous for the efficiency of the latter, in particular for temperature swing adsorption (TSA) purification devices during the purification phase (during passage of the gas into the adsorbent and adsorption of the impurities).

As represented, the circuit may comprise a transfer pipe 16 equipped with a valve 22 that makes it possible to purge a first adsorber 9 with gas (hydrogen) from a second adsorber 10, in order to carry out a step of elution of the latter in regeneration phase (another transfer pipe, not represented, may be provided in order to carry out the reverse purging of the second adsorber 10 with the gas from the first adsorber 9).

This structure and this operation enable a mutualization of the cold source 5 within the station 100 and improve the efficiency of the assembly.

The purification components 9, 10 may, where necessary, require a temporary reheating, for example adsorbents of TSA type may require a reheating during the regeneration phase (temperature for example between 200 and 300° C.). For this purpose, the station 100 may additionally comprise a system 16, 17 for transferring calories between, on the one hand, the compressed gas at the outlet of the compressor 7 and, on the other hand, the purification component 9, 10. For example, a third heat exchanger 17 may be provided at the outlet of the compression component 7 in order to thermally exchange with the compressed hydrogen and the transfer pipe 16 may pass selectively into this third heat exchanger 17 before purging the adsorbent 10 in regeneration phase.

Furthermore, an additional reheater 21 of the gas may optionally be provided. For example, an electric reheater 21 positioned in the transfer pipe 6. The electric reheater 21 is for example positioned downstream of the third exchanger 17 in the direction of flow of the purge gas.

This makes it possible to reheat the adsorbent 9, 10 while cooling the gas leaving the compressor 7. If necessary, downstream of the third heat exchanger 17, the circuit may comprise a fourth exchanger 23 for cooling the gas, which exchanger is supplied with refrigerant fluid, for example via a water circuit 24.

This architecture ensures an efficient economic operation of the station 100.

The operation of the filling station 100 may comprise two separate phases.

In a first operating phase, the buffer container(s) 1, 2 may be filled with gas. The gaseous hydrogen supplied by the source 14 is purified in the purification component 9, 10 then compressed and injected into the buffer containers 1, 2. The filling switches from one container 1, 2 to the other may be carried out when the pressure in the filled container 1, 2 reaches its nominal pressure (typically between 450 and 850 bar). A filling of a buffer container 1, 2 may begin for example when the pressure within it passes below a threshold (for example respectively 350 and 700 bar). The steps are not necessarily consecutive. During this first phase, the source 5 supplies cooling power to the second heat exchanger 13.

In a second operating phase, one or some tank(s) 8 are filled by the station 100. For example, a tank 8 is filled up to a pressure of 700 bar. The tank 8 is equalized successively with the buffer containers 1, 2. The switching from one buffer container 1, 2 to the other may be carried out when the pressure difference between the buffer container 1, 2 and the destination tank 8 is below a predefined threshold. Depending on the initial pressure in the tank 8, pressure equalization steps may be omitted. In a known manner, if necessary and optionally, the compressor 7 may complement or supplement this filling. During this second phase, the cold source 5 supplies cooling power to the first heat exchanger 3. Thus, a same cold group 5 may be provided in order to supply cooling power to the first 3 and second 13 heat exchangers and to cool both the gas for its purification and the purified gas during the filling.

As illustrated schematically in FIG. 2, the first 3 and second 13 heat exchangers advantageously share the same shell, i.e. are incorporated within a same physical entity forming a single heat exchanger in the station. In other words, the first heat exchanger 3 and the second heat exchanger 13 are incorporated in a same housing 15.

As a variant, a coolant may directly cool the adsorber 9, 10 when it is in production mode.

Similarly, a heat exchanger (not represented) may be optionally provided at the inlet of the compressor 7 in order, where necessary, to reheat the gas if the compressor does not tolerate cold gas.

The invention makes it possible to reduce the cost, the overall dimensions and the energy consumption of the filling station.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties; as well as for the specific information for which each is cited.

What is claimed is:

1. A method of filling a tank with pressurized hydrogen via a filling station comprising at least one buffer container and a fluid circuit connected to said at least one buffer container, the circuit of the filling station comprising a first end connected to at least one source of gaseous hydrogen for carrying out the filling of the at least one buffer container with gas originating from the source, the circuit comprising a second end equipped with a transfer pipe intended to be removably connected to the tank to be filled with hydrogen originating from the at least one buffer container, the method comprising the steps of:
   cooling the hydrogen supplied to the tank by transfer of negative calories between a cold source and the hydrogen;
   purifying the hydrogen supplied by the source in a purification component before it is transferred to the at least one buffer container;
   transferring negative calories from said cold source to the hydrogen before and/or during the purification step, wherein the purification step uses at least one purification component selected from the group consisting of a pressure swing adsorption separation device and a temperature swing adsorption separation device; and
   allowing pressurized hydrogen to flow from at least one of the at least one buffer container to the tank.

2. The method of claim 1, wherein the transfer of negative calories between the cold source and the hydrogen supplied to the tank is carried out via a first heat exchanger in thermal exchange with the hydrogen of the circuit and a loop for circulation of heat transfer fluid between the cold source and the first heat exchanger.

3. The method of claim 1, wherein the transfer of negative calories from said cold source to the hydrogen before and/or during the purification step is carried out via a second heat exchanger in thermal exchange and a loop for circulation of heat transfer fluid between the cold source and the second heat exchanger.

4. The method of claim 1, wherein the cold source is one or more cold sources selected from the group consisting of: a reserve of liquefied gas, aqueous ethylene glycol, ammonia solution, propane, and any other refrigerant.

5. The method of claim 4, wherein the cold source is a reserve of liquid nitrogen.

6. The method of claim 1, wherein the circuit of the filling station comprises at least one compression component for compressing pressurized gas in order to fill the at least one buffer container.

7. The method of claim 1, wherein it comprises a step of transferring calories between, on the one hand, the compressed gas at the outlet of the compression component and, on the other hand, the purification component.

8. The method of claim 7, wherein the purification component operates according to a cycle comprising a gas purification phase and a regeneration phase and in that the step of transferring calories between the compressed gas at the outlet of the compression component and the purification component is carried out during the regeneration phase of the purification component.

9. A filling station for a pressurized gaseous hydrogen tank comprising:
   at least one buffer container provided in order to contain pressurized gaseous hydrogen;
   a fluid circuit comprising a plurality of valves, the circuit being connected to said at least one buffer container and comprising a first end intended to be connected to at least one source of gaseous hydrogen for enabling the filling of the at least one buffer container with gas supplied by the at least one source, the circuit comprising a second end comprising a filling pipe intended to be removably connected to a tank in order to fill said tank from the at least one buffer container;
   a cold source of negative calories;
   a circuit for selective transfer of negative calories from the cold source to the hydrogen at the second end of the circuit;
   a component for purifying hydrogen selected from the group consisting of: a pressure swing adsorption separation device and a temperature swing adsorption separation device; and
   a negative calorie transfer circuit for selective transfer of negative calories from the cold source to the hydrogen at the first end of the circuit, upstream of and/or level with the purification component.

10. The station of claim 9, wherein the circuit for selective transfer of negative calories from the cold source to the gas at the second end of the circuit comprises a first heat exchanger in thermal exchange with the gas of the circuit and a loop for circulation of heat transfer fluid between the cold source and the first heat exchanger.

11. The station of claim 10, wherein the circuit for selective transfer of negative calories from the cold source to the hydrogen at the first end of the circuit, upstream of and/or level with the purification component, comprises a second heat exchanger in thermal exchange and a loop for circulation of heat transfer fluid between the cold source and the second heat exchanger.

12. The station of claim 11, wherein the first heat exchanger and the second heat exchanger are incorporated in a same housing.

13. The station of claim 9, characterized in that the circuit of the filling station comprises at least one compressor for compressing hydrogen in order to fill the at least one buffer container and in that the purification component comprises one or more beds of adsorbent of pressure swing adsorption (PSA or TSA) type operating according to a cycle comprising a gas purification phase and a regeneration phase and in that the station comprises a circuit for selective transfer of calories from compressed gas at the outlet of the compressor to the purification component.

* * * * *